3,072,234
CLUTCH FOR TRANSMITTING REDUCED TORQUE UPON REVERSE DRIVE
Jean Maurice and Michel Rist, Paris, France, assignors to Societe Anonyme Francaise du Ferodo, Paris, France, a corporation of France
Filed Feb. 18, 1960, Ser. No. 9,613
Claims priority, application France Jan. 27, 1953
3 Claims. (Cl. 192—48)

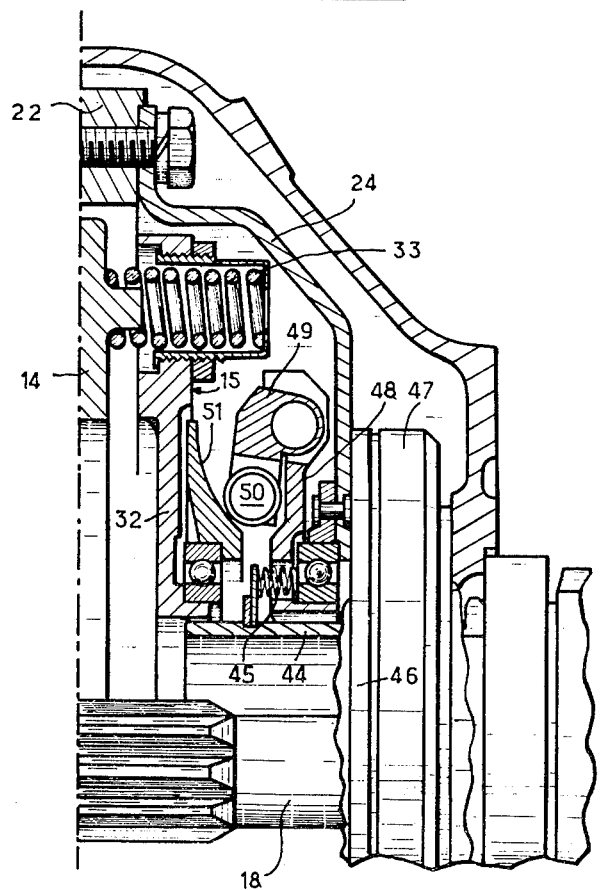
FIG:2a

United States Patent Office 3,072,234
Patented Jan. 8, 1963

This is a continuation-in-part of our prior application Serial No. 406,528 filed January 27, 1954, Patent No. 2,940,569 granted June 4, 1960.

The present invention relates to clutches of the kind comprising, between a driving shaft turning in one single direction of rotation and a driven shaft connected through a transmission, such as a gear-box, to the driving wheels of a vehicle, a friction-clutch formed by at least one pair of friction surfaces. By means of a control arrangement, these surfaces may either be totally disengaged, or they may have a limited sliding action or slip when starting-off or changing gear, or they may transmit the full torque of the engine without slip. The invention is more particularly concerned with clutches of the kind referred to, in which the control of the said friction is automatic, for example centrifugal, and still more particularly with centrifugal clutches associated with synchronised gear-boxes.

These clutches make the work of driving both easy and pleasant and reduce the risk of error to a minimum, but on the other hand, they give rise to dangers which are not negligible. In the first place, the automatic nature of the operation of the clutch removes from the direct control of the driver the determination of the time intervals and of the amount of declutching during re-starting and changing gears. If this does not prove troublesome when starting-off, since the centrifugal mechanism connected to the driving shaft brings into operation a very gradual clutch engagement whereby all risk of stalling is eliminated, on the other hand, changes of gear and more particularly changing-down of gears may result in jerks in the transmission which may eventually lead to skidding of the driving wheels of the vehicle. For example, when passing from third gear to second gear, and when the driver releases the accelerator to slow-down the vehicle, the synchronised gear-box enables an immediate operation to follow in which the driving shaft is immediately coupled to a driven shaft, the speed of which, multiplied by the ratio of the selected combination, has become greater than its own speed. The driving shaft thus introduces into the transmission at the end of the period of slip, by reason of the forces of inertia which are additive to the desired braking effect due to the compression of the engine, a braking couple which is sufficient to cause the driving wheels to skid. The longer this skidding period lasts, the more dangerous it becomes. It lasts for the time required to accelerate, under its influence, the speed of the engine until this is equal to the speed of the driven shaft, whose speed is determined by the speed of the vehicle. The duration of the skidding period increases as the difference increases between the speeds of the driving shaft and the driven shaft. The danger of skidding thus becomes more serious when the driver has allowed the engine to slow-down to a greater extent and when the selected gear combination differs more widely from the first combination.

The present invention has for its object improvements in clutches of the type referred to which avoid the drawbacks indicated.

In accordance with the invention, a clutch comprises a driving shaft, a driven shaft member, at least a pair of plate members axially movable with respect to each other. At least one of the plate members is rigid in rotation with said driving shaft at least one friction disc member is located between the plate members. A control means is provided for axially displacing the plate members with respect to each other to selectively grip and release the friction disc member between the plate members, and a one-way coupling device is disposed between two of the plate members.

In one form of embodiment the one-way coupling device operates between one friction disc and the driven shaft while another friction disc is provided directly rigid in rotation with the driven shaft. In a modification, the one-way coupling operates between one of the plates and the driving shaft. In any case the one-way coupling device, when the driven shaft tends to over-run the driving shaft, defines within the frictional surfaces of the clutch engageable or disengageable as a whole, a portion thereof which constitutes a torque limiter.

Further objects, features and advantages of the invention will furthermore become clear from the description which follows below of forms of embodiment chosen by way of example with reference to the attached drawings, in which:

FIG. 2a is a half-view in longitudinal cross section of another part of the clutch of FIG. 2;

Figure 1:
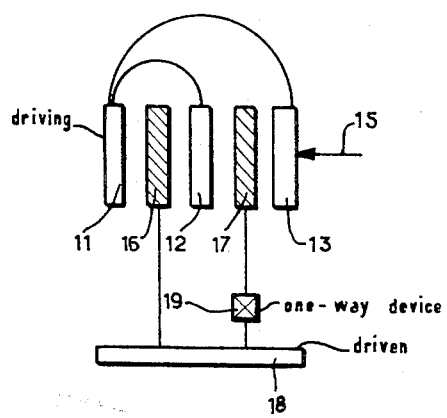
FIG. 1 is a schematic view of one form of the invention.

Reference will first be made to the schematic view of FIGURE 1 where is seen a first plate 11 which is rigid with the driving shaft (not shown on FIGURE 1 but shown at 10 on FIGURE 2) of the clutch. A second plate 12 is rigid in rotation with the driving shaft, and a third plate 13 is also rigid in rotation with the driving shaft. The second plate 12 and the third plate 13 are axially movable with respect to the first plate 11 and a control means 15 represented diagrammatically by an arrow is applied to the plate 13 for displacing the plates 12 and 13 to selectively grip and release as a whole a first friction disc or plate 16 located between plates 11 and 12 and a second friction disc or plate 17 located between plates 12 and 13. The control means 15 can be of the type illustrated in our United States Patent No. 2,940,569 and will be described hereinafter with reference to FIGURE 2a.

The disc 16 is rigid in rotation with the driven shaft 18 of the clutch while a one-way coupling device 19, for instance a free-wheel, operates between the disc 17 and the driven shaft 18.

When the driving shaft effectively drives the driven shaft, and if the gripping control 15 is operative, the one-way coupling device 19 is locked and the torque which is transmissible between both shafts is defined by all the frictional surfaces, in contact, of the plates 11, 12, 13 and of the discs 16, 17, i.e. in the example shown on FIGURE 1 by four pairs of frictional surfaces.

When the driven shaft tends to over-run the driving shaft, what is the case when the driver of a vehicle equipped with the clutch releases the accelerator to slow-down the vehicle, then the one-way coupling device 19 is freed and the torque which is transmissible between both shafts is defined by only a part of the frictional surfaces themselves and more precisely by the surfaces of contact of the plates 11 and 12 with the disc 16, i.e. only two pairs of frictional surfaces. There is thus avoided any risk of skidding of the driving wheels of the vehicles.

Figure 2:
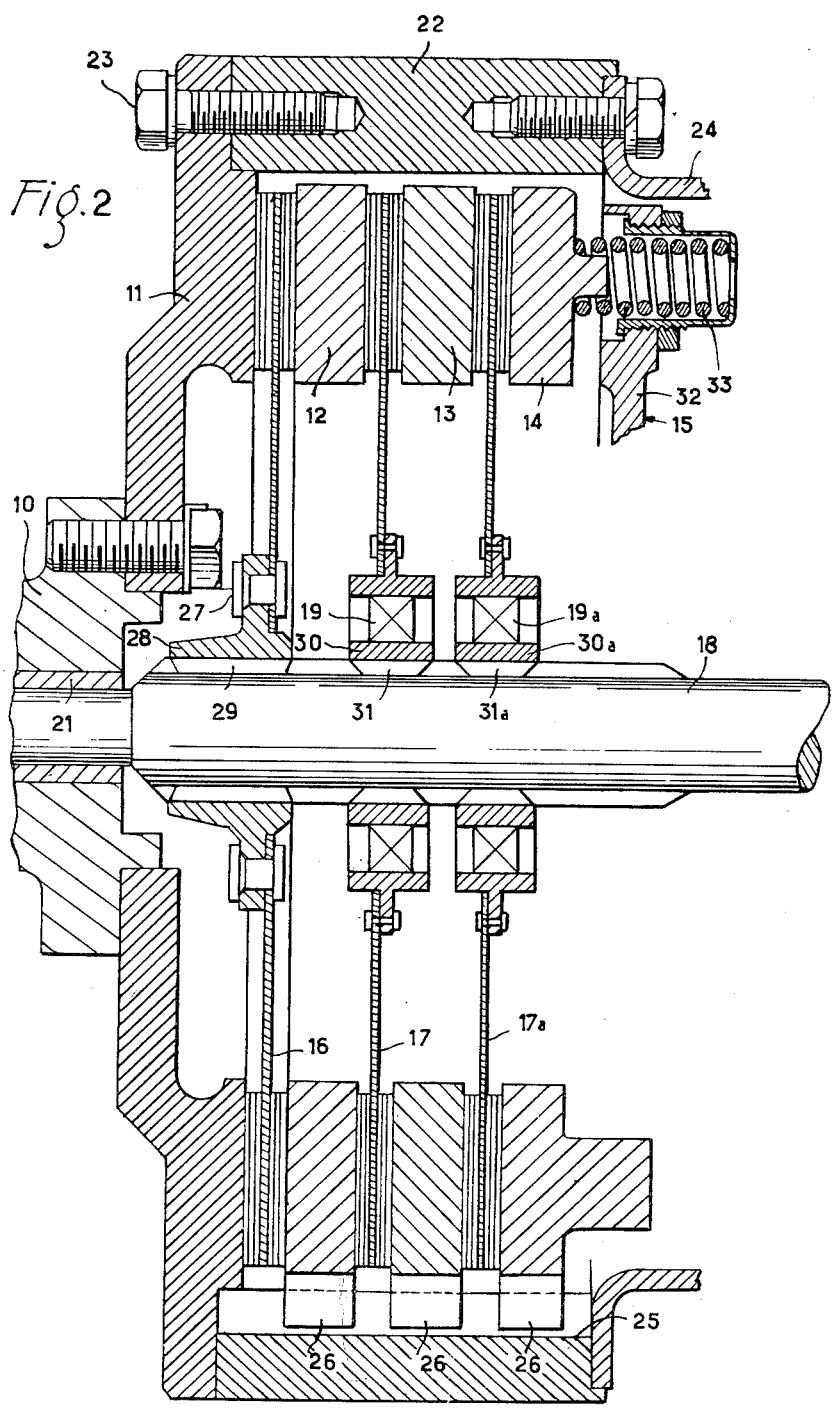
FIG. 2 is a view of a part of a clutch in longitudinal cross-section embodying a device according to FIGURE 1.

Referring now to FIG. 2 and FIG. 2a which show a clutch constructed in accordance with the device of FIG. 1, there is seen at 10 the driving shaft of the clutch and at 11 the first plate here forming the fly-wheel of the clutch.

The clutch has (FIG. 2) four plates 11, 12, 13 and 14 and includes three intermediate discs or plates 16, 17 and 17a. The driven shaft 18 is centered at 21 in the driving shaft 10. A ring member 22 is fixed at 23 to the plate 11 and carries a protective casing 24. The ring member 22 comprises slots 25 in which tenons 26 of the plates 12, 13 and 14 are slidably engaged.

One of the discs 16 is fixed by rivets 27 to its hub 28 which is mounted by splines 29 on the driven shaft 18 so that the disc 16 is rigid in rotation with the shaft 18 while another disc 17 is coupled through the intermediary of the free-wheel 19 with the hub 30 which is mounted by splines 31 on the shaft 18 so that the disc 17 has a one-way rotational connection with the shaft 18. Similarly the disc 17a is coupled by a free-wheel 19a with the hub 30a mounted by splines 31a on the shaft 18. There is seen at 15 the control which here comprises a pushing member 32 and springs 33. The pushing member 32 can be actuated or released as shown more particularly on FIG. 2a i.e. in a similar manner as described in our United States Patent No. 2,940,569. A sleeve 44 which is slidably and freely mounted on the casing 24 but which is restrained axially by a spring 45 surrounds the driven shaft 18 and is fixed to a friction collar 46. The latter is inserted between the casing 24 and an electro-magnet 47 so that when the electro-magnet is de-energized with a view to engaging the clutch the sleeve 44 is caused to rotate with the casing 43 while when the electro-magnet is energized in order to disengage the clutch the sleeve 44 remains stationary. A head-carrier 48 which rotates with the sleeve 44 but which has a fixed axial position is provided with heads 49 having rollers 50. The latter cooperate with a cam 51 which is freely mounted but which is axially locked to the member 32. The operation is similar to that of FIG. 1 at the exception that the limitation of the torque when the shaft 18 tends to over-run the shaft 10 is more important than in FIGURE 1 since it concerns two discs among three instead of one among two.

Figure 3:
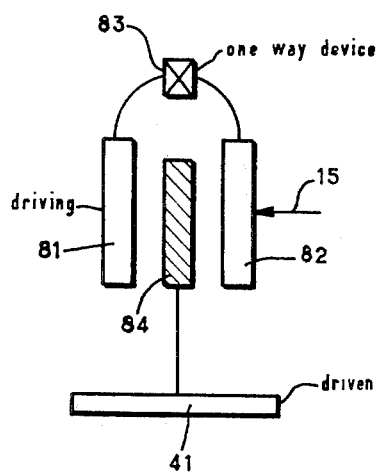
FIG. 3 is a schematic view of another form of the invention.

Referring now to the schematic view of FIG. 3, there is seen a first plate 81 which is rigid with the driving shaft (not shown on FIG. 3 but shown at 40 on FIG. 4) of the clutch. A second plate 82 is illustrated and a one-way coupling 83 disposed between the second plate 82 and the first plate 81 or the driving shaft. A friction disc or plate is located between the plates 81 and 82 and is connected to the driven shaft 41 for rotation therewith. The control means for gripping the disc 84 between the plates 81 and 82 is represented by an arrow 15.

When the driving shaft effectively drives the driven shaft, and if the gripping control 15 is operative, the one-way coupling device 83 is locked and the torque which is transmissible between both shafts is defined by all the frictional surfaces, in contact, of the plates 81 and 82 and of the disc 84, i.e. in the example shown on FIG. 3 by two pairs of frictional surfaces.

When the driven shaft tends to over-run the driving shaft, then the one-way coupling 83 is freed and the torque which is transmissible between both shafts is defined by only a part of the frictional surfaces themselves and more particularly by the surfaces of contact between the plate 81 and the plate 84, i.e. only one pair of frictional surfaces.

Figure 4:
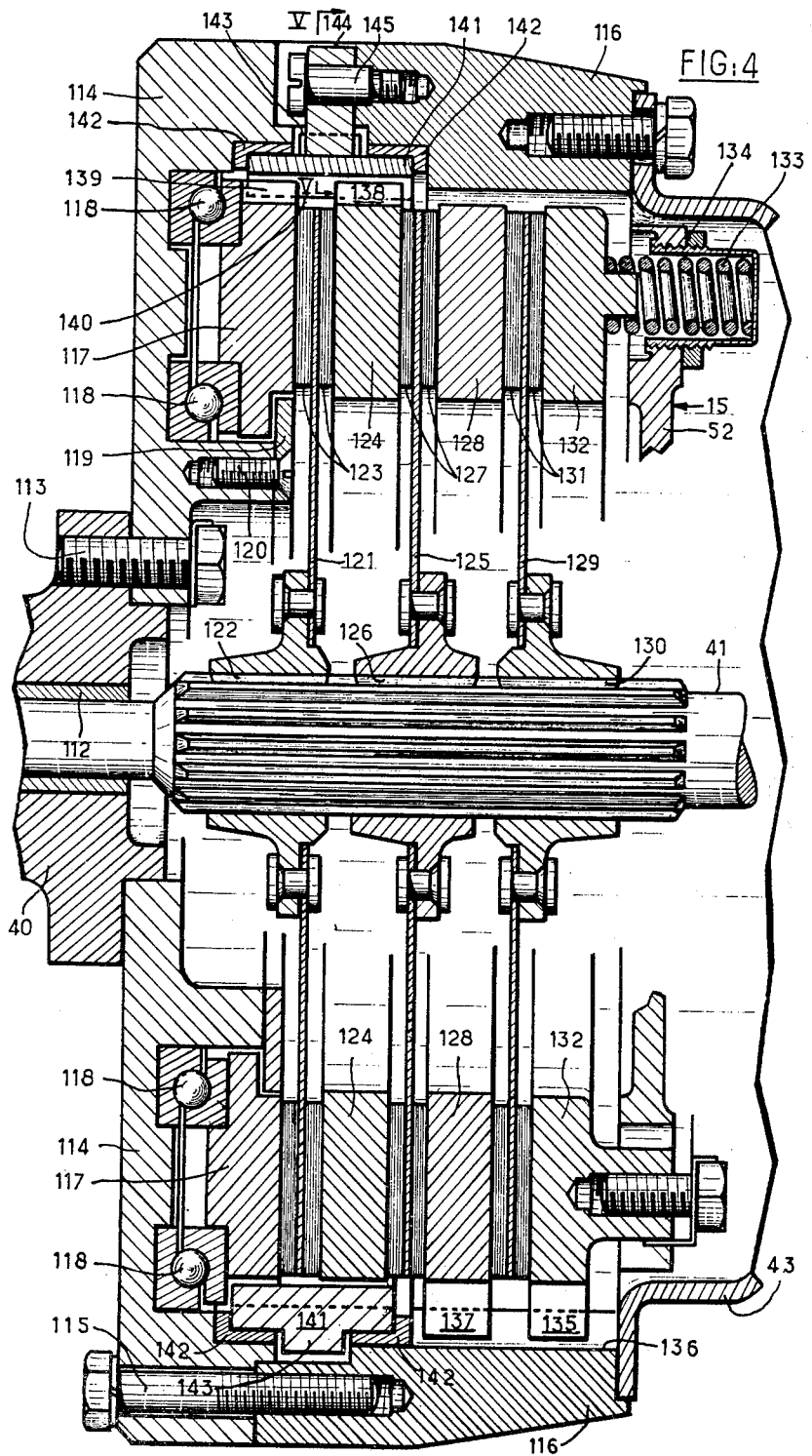
FIG. 4 is a view of a clutch in longitudinal cross-section embodying a device according to FIGURE 3.
Figure 5:
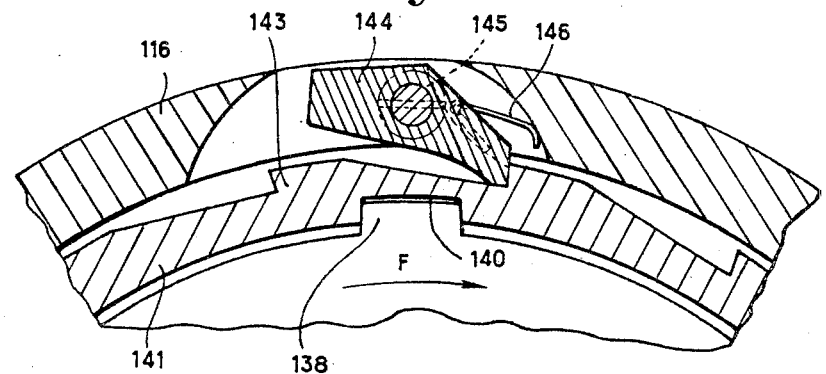
FIG. 5 is a fragmentary transverse cross-section view taken on line V—V of FIGURE 4.

Referring now to FIGS. 4 and 5 which show a clutch constructed in accordance with the device of FIG. 3, there is recognised in FIG. 4 the driving shaft 40 of the clutch and the driven shaft 41 which forms the primary shaft of a synchronised gear-box and which is centered by means 112 in the driving shaft 40.

The driving shaft 40 has fixed to it at 113 a flywheel 114 which is itself fixed at 115 to a ring member 116 which carries the protective casing 43. A support or reaction plate 117 of the clutch is mounted against the fly-wheel 114 with the interposition of two ball-thrust bearings 118. The support plate 117 is, when disengaging the clutch, held against the bearings 118 by means of a ring 119 fixed at 120 to the fly-wheel 114.

A friction-disc or plate 121 slidably mounted on the driven shaft 41 but made to rotate therewith by splines 122 has its linings 123 arranged between the support plate 117 and a first intermediate plate 124.

Another friction-disc or plate 125 which is also slidably mounted on, but adapted to rotate at 126 with the driven shaft 41 is provided with linings 127 arranged between the first intermediate plate 124 and a second intermediate plate 128.

A third friction-disc or plate 129 which is also mounted on shaft 41 and adapted to engage splines at 130 and rotate with the driven shaft 41. This third plate 129 is provided with linings 131 arranged between the second intermediate plate 136 and an outer thrust-plate 132. The latter is associated with the centrifugal control mechanism which urges it at will, in response to centrifugal force, towards the engaged position in which the three discs 121, 125, 129 are gripped between the plates 117, 124, 128, 132 or, on the contrary, retains it in the disengaged position in which the discs are no longer gripped between the plates.

In the example shown in FIG. 4, it is seen that the thrust-plate 132 is forced towards the engaged position by means of springs 133 the pressure of which is adjustable by means 134 from the transfer-plate 52 of the centrifugal mechanism.

The thrust-plate 132 is mounted slidably inside the ring member 118 but is adapted to rotate therewith and, to this end, it is provided with tenons 135 which are engaged in slots 136 in the ring. In the same way, the intermediate plate 128 is slidably mounted on, but rotates with the ring member 116 and comprises tenons 137 engaged in the slots 136. On the other hand, the intermediate plate 124 and the support plate 117 are provided respectively with tenons 138 and 139 engaged in the slots 140 of a ring 141. The latter is pivotally mounted against rings 142 located inside the ring member 118.

The ring 141 is provided on its periphery and between the rings 142, with teeth 143 which co-operate with the pawls 144 (FIGS. 4 and 5) uniformly spaced apart and pivotally mounted at 145 inside the ring member 116. A spring 146 urges each pawl 144 into engagement with the teeth 143.

As is seen in FIG. 4, the pawls 144 associated with the teeth ensure a rigid rotary drive of the ring 141 from the member 116 in the direction F (FIG. 5) of rotation of the engine when the driving ring 116 tends to rotate more quickly than the ring 141, and on the contrary permit a relative slip to occur, when the ring 141 tends to rotate more quickly than the member 116 in the same direction F.

When the torque of the ring member 116 acts effectively to rotate the driven shaft 41 through the medium of the engaged clutch, that is to say when the member 116 tends to rotate more quickly in the direction F than the driven shaft 41, all the plates 117, 124, 128, 132 are rigidly coupled for rotation with the driving ring 116 and the engine torque is transmitted to the driven shaft 41 by six pairs of friction surfaces 117—123, 123—124, 124—127, 127—128, 128—131, 131—132. These six pairs of surfaces and the strength of the springs 133 forming the control 15 are chosen so that this engine torque shall be wholly transmitted without risk.

When the engine applies a braking torque to the driving ring 116, that is to say when the driven shaft 41 tends to rotate more quickly in the direction F than the driving ring, the plates 117, 124, are able to rotate freely, by virtue of the bearings 118 and the rotational sliding action permitted between the ring 141 and the driving ring 116, together with the driven shaft under the action of the discs 121 and 125. The pairs of friction surfaces 117—123, 123—124, 124—127 are thus rendered inoperative in braking the shaft 41 from the driving ring and this braking action can only be effected by the sole intermediary of the three other pairs of friction surfaces 127—128, 128—131, and 131—132.

It will be appreciated that in the present alternative form, the limiting device in accordance with the invention, has no effect on the inertia of the driven shaft, which is reduced to a minimum in the other forms of embodiment. In addition, the discs 121, 125, 129, are of the standard type which provide a convenient interchangeability of the parts of the clutch which are most subject to wear. It will also be noted that the arrangement of the pawls on the periphery of the driving shaft enables these pawls to be subjected to moderate stresses.

In a parallel assembly of this kind, the torque transmitted by the pairs of friction surfaces 127—128, 128—131, 131—133, of the limiting device, depends at any instant on the momentary force of the complete clutch. Now, in the case of a centrifugal clutch, the force or strength of the clutch is generally less in the case of low engine speeds than at higher speeds. It being understood that the pairs 127—128, 128—131, 131—132, will be chosen in such manner that, for the maximum strength of the centrifugal clutch, the transmittable torque shall be less than the value which corresponds to the couple causing skidding of the driving wheels of the vehicle, it will be made certain that for a strength less than the said maximum strength, that is to say for a lower engine speed, the transmittable torque will be reduced, and that in consequence a slip will take place in the transmission with an increased margin of safety.

This feature is of considerable interest in the case of a centrifugal clutch, particularly when it is associated with a synchronised gear-box, in which a driven shaft rotating at high speed may be coupled to a driving shaft rotating at a low speed, more especially in changing-down gear ratios, the danger of skidding of the driving wheels being the more acute since, for a given speed of the driven shaft, the driving shaft rotates less quickly.

With the parallel assembly of the torque limiter in a centrifugal clutch, the limiter, which is subjected to a gripping action which varies according to the speed of the engine, thus automatically introduces a slip with a margin of safety increasing with the danger of skidding.

The transmission constructed in accordance with the invention thus makes full use of the advantages of automatic operation inherent in centrifugal clutches, and particularly in centrifugal clutches associated with synchronised gear-boxes, while at the same time it is free from the danger of skidding and has, in consequence, greater safety.

The proportion of the total frictional surface utilised to transmit the direct engine torque and the partial frictional surface area used for the transmission of the braking torque may be chosen at will with great precision in each particular case by varying the number of pairs of friction surfaces rendered inoperative amongst all the pairs of surfaces and/or by adopting, for a distance from the axis which is preferably uniform, larger widths of linings on certain pairs of friction surfaces than on the others. This remains true whatever may be the given number of discs of the clutch, for example a single disc, two discs, three discs or more. In addition, different kinds of friction material may be adopted.

In the form of embodiment of FIG. 4, which has three discs, three pairs of surfaces are inoperative out of six pairs, so that if the linings has the same width and were of the same nature, the transmittable braking torque would be equal to half the transmittable direct engine torque. These conditions may be looked for in the case of heavily loaded vehicles in which the gear ratios or combinations are close to each other.

Figure 6:
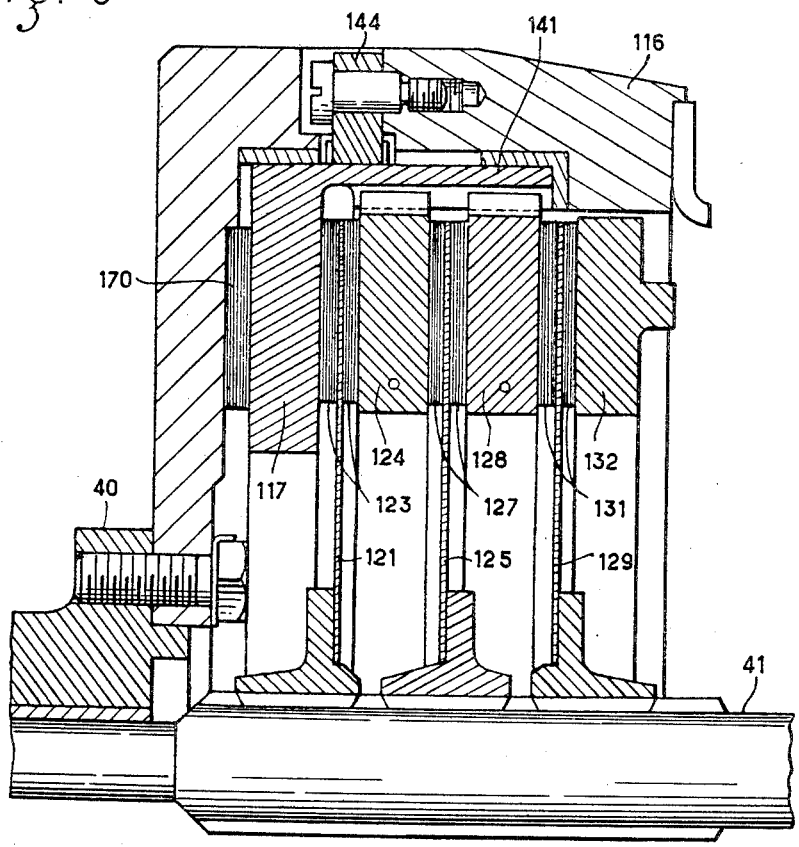
FIG. 6 is a sectional view similar to that of FIG. 4 of another embodiment of a clutch provided with the invention.

In another form of embodiment (FIG. 6) the arrangement is similar to that which has been described with reference to FIGS. 4 and 5. In the alternative form of FIG. 6, the discs 121, 125 and 129 are ordinary discs as in the example shown in FIG. 4. The thrust-plate 132 is coupled for rotation to the driving ring, while the intermediate plates 124, 128 and the support plate 117 are coupled for rotation to a ring 141 similar to that of FIG. 4 and co-operating with pawls 144 mounted in the driving ring 116. In the present embodiment, the ring 141 is shown fixed to one of the plates, the plate 117.

The support plate 117, instead of being mounted against the fly-wheel 114 with bearings, is applied against a friction lining 170 fixed to this fly-wheel.

It will be understood that with this arrangement and with the linings 123, 127, 131 and 170 which have the same friction area with about the same distance from the axis, the braking torque transmittable is approximately one-third of the direct transmittable driving torque. The pairs of surfaces 132—129, 117—170, only being operative in the free-wheel direction of rotation of the pawls.

As in the previous case, any other proportion may be chosen at will by varying the nature of the material, the surface area, and the distance of the friction linings from the axis of rotation.

What we claim is:

1. A clutch comprising a driving shaft, a driving plate assembly connected with said driving shaft and having at least a first plate permanently rigid in rotation with said driving shaft, a driven shaft, a driven plate assembly connected with said driven shaft and having at least a second plate permanently rigid in rotation with said driven shaft, one of said plate assemblies having at least a third plate, means mounting said third plate movable axially of said driven shaft so that all plates of said assemblies form a series of adjacent frictionally engageable plates and having substantially a same unvariable diameter, plates of the driving asssembly being disposed alternately with plates of the driven assembly in said series, control means operable to selectively cause all of said plates to frictionally engage to transmit all of the torque from said driving shaft to said driven shaft and operable to selectively release all of said plates to transmit zero torque and a torque limiter for limiting the transmissible torque comprising a one-way coupling interconnecting said third plate and one of said shafts operable automatically when said driven shaft tends to overrun said driving shaft to release said third plate from plates in said series adjacent to said third plate to transmit a preselected reduced value of transmissible torque between said shafts corresponding to a value of torque precluding the overrunning of the driving shaft by the driven shaft.

2. A clutch as claimed in claim 1, wherein said third plate is a plate of the said driven assembly and said one-way coupling device is arranged for unidirectionally coupling said third plate with said driven shaft.

3. A clutch as claimed in claim 1, wherein said third plate is a plate of the said driving assembly and said one-way coupling device is arranged for unidirectionally coupling said third plate with said driving shaft.

References Cited in the file of this patent

UNITED STATES PATENTS

| | | |
|---|---|---|
| 1,910,141 | Wemp | May 23, 1933 |
| 2,082,129 | Van Ranst | June 1, 1937 |
| 2,136,811 | Burtnett | Nov. 15, 1938 |